United States Patent

Shimp, Jr. et al.

[11] Patent Number: 5,926,499
[45] Date of Patent: Jul. 20, 1999

[54] METHOD FOR PREPARATION OF FUSED MAGNESIA PARTICULATES

[76] Inventors: Harry B. Shimp, Jr., 30 Sterncrest Dr., Chagrin Falls, Ohio 44022; Steven M. White, 1800 Canterbury Dr., Morristown, Tenn. 37814; Charles W. Keller, 136 Magnolia Dr., Greeneville, Tenn. 37743

[21] Appl. No.: 09/119,768

[22] Filed: Jul. 21, 1998

[51] Int. Cl.⁶ ........................................... H05B 3/60

[52] U.S. Cl. ................................. 373/54; 373/56

[58] Field of Search ................... 373/54, 56, 84; 264/15; 237/35; 338/238; 501/108, 101, 117

[56] References Cited

U.S. PATENT DOCUMENTS

| | | | |
|---|---|---|---|
| 2,790,019 | 4/1957 | Stalego | 237/35 |
| 3,943,211 | 3/1976 | Dickey et al. | 264/15 |
| 4,087,777 | 5/1978 | Clasen et al. | 338/238 |
| 4,349,909 | 9/1982 | Cichy | 373/84 |
| 5,595,948 | 1/1997 | Kimura et al. | 501/108 |

*Primary Examiner*—Teresa Walberg
*Assistant Examiner*—Quang Van
*Attorney, Agent, or Firm*—John F. McDevitt

[57] ABSTRACT

A fused magnesia ingot being discharged from an electric furnace at extremely elevated temperatures is thermally insulated to improve product yield. Thermal insulation provided with a blanket covering of refractory material can be used for this purpose.

16 Claims, 1 Drawing Sheet

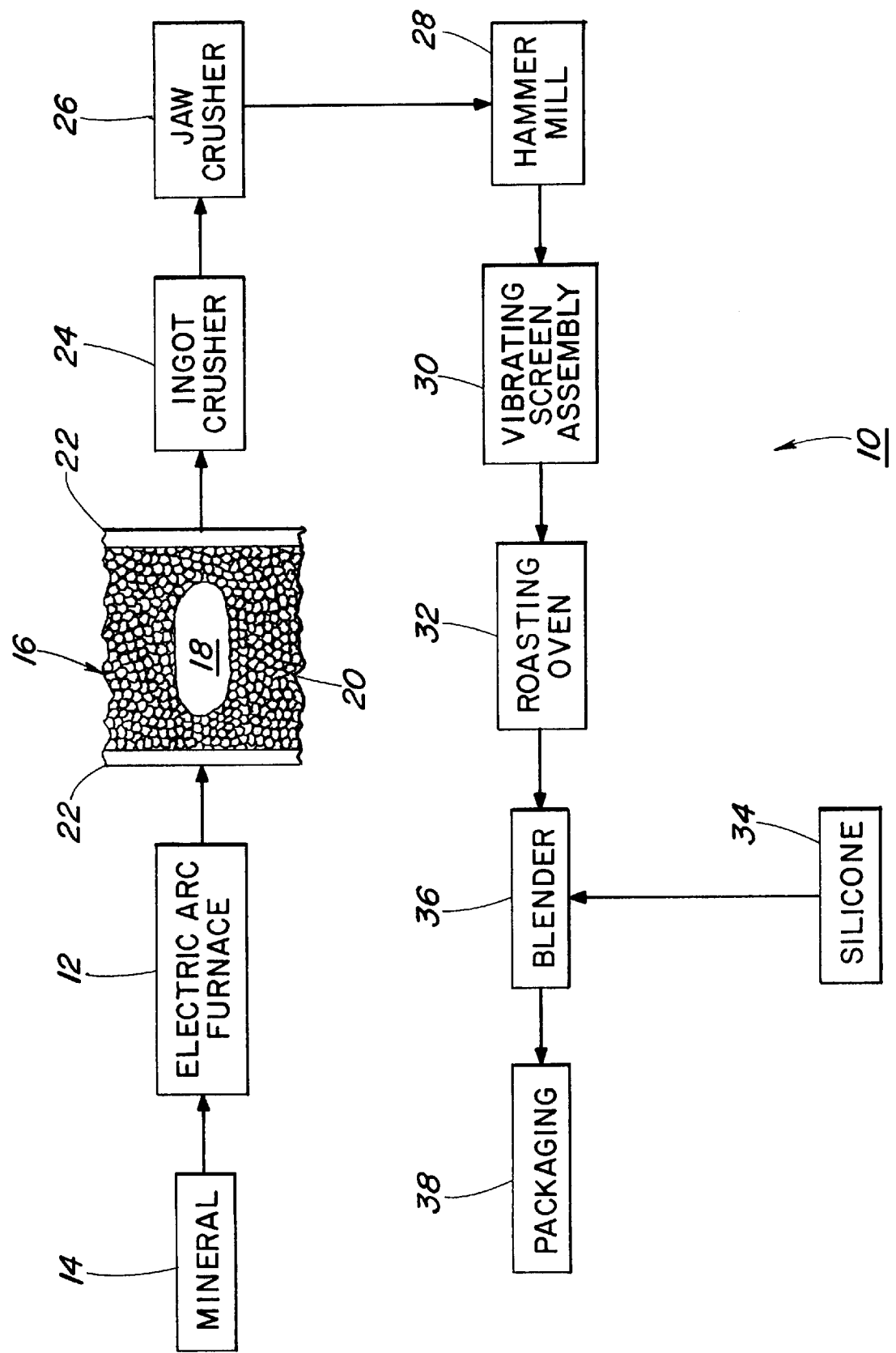

METHOD FOR PREPARATION OF FUSED MAGNESIA PARTICULATES

BACKGROUND OF THE INVENTION

This invention relates generally to an improved method for increasing product yield during the manufacture of crystalline magnesia particulates and more specifically to the benefits derived by modifying the cooling rate for a fused magnesia ingot being discharged from an electric furnace at extremely elevated temperatures.

Fused magnesia particulates are conventionally produced in an electric arc furnace forming a solid ingot from the molten starting material which is thereafter mechanically crushed and ground by various means to a final desired particle size. A wide assortment of fused magnesia products can be manufactured in such manner to include various types and grades for dissimilar end use applications. To further illustrate such diversity, this material is now commonly employed in electrical heating elements, refractory structures, and friction brake constructions. The electrical grade material for heating elements typically ranges in magnesia purity from at least 50 weight percent up to approximately 98 weight percent, with a grain size ranging from approximately 20 to 40 weight percent in the size range minus 40 mesh United States screen size, while further exhibiting required electrical resistance and thermal conductivity characteristics. A still further requirement for said electrical heating element application is mechanical flow of the fused magnesia particulates when filling the metal casings employed for said elements which can be enhanced by coating the magnesia particles with a solid or liquid lubricant, such as a silicone and the like. As distinct therefrom, a typical fused magnesia product for refractory structures such as bricks and blocks maintains a relatively high purity magnesia content in the 95–98 weight percent range together with a particle size from 80–2000 microns. The physical properties commonly specified for fused magnesia products to replace asbestos in friction brake constructions includes high temperature stability and Mohs hardness of at least 5. To satisfy these requirements a typical product ranges in magnesia content from approximately 90–99 weight percent with a particle size in the minus 40 plus 60 mesh United States screen size from approximately 25–35 weight percent.

A fused magnesia product suitable for electrical heating elements can be produced in the above manner utilizing a conventional submerged arc electric furnace of the general type long employed for steel-melting. Electric heating is supplied with dual or multiple electrodes to establish a reaction zone within the fusion vessel where the mineral charge becomes melted. In doing so, fusion can commence upon a batch charge already present in the furnace vessel with additional mineral batches being charged during the fusion process. When the charge material has been converted to a molten state, the applied electrical power is terminated allowing the furnace contents to cool from the extremely elevated furnace discharge temperatures providing a solid ingot with varying degrees of recrystallation. The furnace ingot is subsequently crushed by conventional mechanical means such as with a jaw crusher followed by a hammer mill which can still further include magnetic separation means to remove any entrained metal contaminants. A conventional vibrating screen apparatus is next employed to provide the desired particle size from the crushed material while further yielding varying amounts of undersized particles passing through 325 mesh screen size. The desired particle size material is then heated in an oxidizing atmosphere to produce approximately 1000° C. for additional impurity removal and optionally blended with a suitable lubricant to provide a free-flowing powder having the above defined electrical and physical characteristics suited for heating element utilization.

The above described manufacturing process results in a solid ingot being discharged from the electric furnace at extremely elevated temperatures which is of a non-uniform composition. The innermost central region of the discharged ingot remains partially molten for recrystallization upon cooling to the recrystallization temperature with the outer peripheral regions surrounding the central core region consisting only of sintered or partially fused magnesia crystals. By slowing temperature loss in the discharged ingot upon its removal from the electric furnace it becomes possible not only to enhance additional recrystallization in the central core region of said ingot but to also enhance further melting in its outer peripheral regions. Such reduction in heat loss when cooling to ordinary ambient temperatures can thereby promote a desirable increase in the ingot size with additional recrystallized and sintered magnesia crystals being formed during the extended cooling period. A still further benefit promoted by slowing the ingot cooling rate from the extremely elevated furnace discharge temperatures is an improved chemical purity of the recrystallized magnesia crystals. Such recrystallized material will generally have fewer contaminants due to a refining process involving volatilization and migration of contaminants from the central core region of the cooling ingot. It remains desirable, therefore, to provide simple and effective means whereby final product yield of the resulting particulate mixture of recrystallized and sintered magnesia particulates can be achieved in the desired manner.

It is one object of the present invention, therefore, to modify the preparation of fused magnesia crystalline particulates so that increased product yield having a higher purity results.

It is another object of the present invention to provide novel process means for a more effective preparation of fused magnesia crystalline particulates from the starting material.

Still another object of the present invention is to provide novel means when fusing a bulk mass of magnesia mineral to promote larger amounts of both recrystallization and sintered crystal formation.

These and still further objects of the present invention will become apparent upon considering the following detailed description of the present invention.

SUMMARY OF THE INVENTION

It has now been discovered that a removal of the still heated solid ingot from the electric furnace before its central core region fully reaches the recrystallization temperature of molten magnesia crystals contained therein enables further processing in accordance with the present invention. More particularly, the solid ingot after being discharged from the electric furnace while still at extremely elevated temperatures is next thermally insulated for cooling to ambient temperatures at a lower cooling rate. Extending the cooling time period in such manner with temperature loss in the discharged ingot being retarded promotes additional recrystallization of still molten magnesia material in a central core region of said ingot along with further melting of only sintered material in the outer peripheral regions of the ingot. Such additional melting of sintered regions in the thermally insulated ingot understandably increases the ingot size and weight for subsequent pulverization by mechanical means after cooling to ambient temperatures. A thermally insulated ingot cooled to ambient temperatures in such manner can thereby be expected to contain larger amounts of both recrystallized and sintered material when pulverized in the customary manner. A still further benefit attributable to thermal insulation of the discharged furnace ingot during cooling is enhancement of a chemical refining process occurring in the central core region which enables the recrystallized magnesia material to have fewer contaminants. Contaminants are removed with added heat retention by increasing volatilization from the central core region of the thermally insulated furnace ingot with larger and more chemically pure crystals being formed as a consequence.

Various thermal insulation means can be employed in the foregoing manner to provide the desired results. In one representative embodiment, the discharged furnace ingot can simply be covered in whole or in part with a blanket formed by commercially available fibrous refractory material while cooling. In a different representative embodiment, the discharged furnace ingot is cooled to ambient temperatures while being physically engaged about the ingot's sides with various known refractory materials such as fire brick, refractory ramming mixes, castable refractories and the like. A thermally insulated metal shell which encases the discharged furnace ingot during cooling can also provide a suitable heat retention means for practice of the presently improved method.

BRIEF DESCRIPTION OF THE DRAWING

The accompanying drawing is a material flow chart depicting representative processing equipment employed for practice of the present method.

DETAILED DESCRIPTION OF THE PREFERRED EMBODIMENTS

Referring to the accompanying drawing there is depicted representative processing equipment for carrying out the improved method of the present invention. More particularly, said drawing provides a material flow chart utilizing conventional manufacturing equipment for sequential fusion and size reduction of a typical magnesia mineral in accordance with the present method. Said flow chart 10 utilizes a conventional electric arc furnace 12 charged with said mineral 14 to form a solid ingot product 16 which is discharged from the furnace at an extremely elevated temperature condition. The discharged ingot 16 retains a central molten core region 18 by removal from the electric furnace before the recrystallized temperature has been fully reached for a sufficient time period while further having outer peripheral regions 20 formed with sintered or partially melted magnesia crystals. Removal of the still heated ingot to the surrounding ambient atmosphere is accompanied by thermally insulating the ingot sides with a blanket covering of fibrous refractory material 22. Cooling the discharged ingot to ambient temperatures in this manner slows the cooling rate sufficiently to increase ingot size resulting from added recrystallization in the central core region together with added melting of sintered magnesia crystals in the outer peripheral regions of the discharged ingot. Additional chemical refining is also promoted by retarding heat loss from the discharged ingot in such manner with contaminants becoming volatilized more readily during the lengthened cooling period. After cooling to ambient temperatures, the insulating blanket 22 is removed from the ingot for crushing of the resulting composite physical mixture of recrystallized and sintered magnesia crystals employing ordinary mechanical means 24. A conventional jaw crusher 26 is next utilized to further reduce the physical size of the relatively large chunks of the fused magnesia material produced upon ingot breakup. Still further size reduction of said fused magnesia material is next carried out with a conventional hammer mill 28 to provide a particle size distribution suitable for separation in a conventional vibrating screen assembly unit 30 in order to furnish a particle size material required for the particular end use application, such as heating elements and the like. The desired physical size particulates are next transferred from said vibrating screen apparatus 30 to a conventional roasting oven or rotary kiln 32 where heating of said material to elevated temperatures of approximately 1000° C. removes further possible contaminants incorporated during prior processing steps. Optional addition of silicone resin 34 to the desired size particulates follows said treatment and is conducted in a conventional blender means 36. While not specifically depicted in the accompanying drawing, further optional magnetic separator means can also be employed during processing of the disclosed fused magnesia particulates in the foregoing manner in order to assist with further removal of entrained contaminants. Final packaging of the desired size particulates employing conventional container means 38, such as barrels or bags, completes the improved processing method in accordance with the present invention.

It will be apparent from the foregoing description that a broadly useful and novel method has been provided to improve the product yield of crystalline materials being solidified when cooled to ambient temperatures from a molten condition. It is contemplated that the presently improved method can be applied to crystalline materials other than magnesia as well as carried out with processing equipment and thermal insulation means other than above specifically illustrated. For example, many other commercially available types of equipment can be used to effect physical size reduction of the particular crystalline material after fusion. Likewise, it is contemplated that size separation of the reduced crystalline particulates can be carried out with already known apparatus other than a vibrating screen assembly. Additionally, the hereinbefore mentioned thermal insulation means other than an insulating blanket can be substituted in order to effectively retard cooling of the fused ingot to ambient temperatures while still heated to a partially molten condition. Consequently, it is intended to limit the present invention only by the scope of the appended claims.

What we claim as new and desire to secure by Letters Patent of the United States is:

1. A method to prepared fused magnesia particulates which comprises:
    (a) fusing a batch charge of mineral grade magnesia crystals in an electric furnace to form a heated solid ingot having a central molten core,
    (b) removing the still heated solid ingot from the electric furnace before the central core of said ingot has reached the recrystallization temperature of magnesia,
    (c) insulating the heated solid ingot while said ingot cools to ambient temperature forming a central core of recrystallized magnesia crystals and an outer ingot periphery of sintered magnesia crystals, and
    (d) pulverizing the cooled ingot by mechanical means to produce a physical mixture of recrystallized and sintered magnesia particulates.

2. The method of claim 1 wherein additional magnesia batches are charged to the electric furnace during fusion.

3. The method of claim 1 wherein chemical impurities in the batch charge are removed from the recrystallized magnesia crystals during ingot cooling.

4. The method of claim 1 wherein a larger size ingot is formed during cooling.

5. The method of claim 1 wherein a larger amount of recrystallized magnesia crystals is formed during insulated ingot cooling than is formed during non-insulated ingot cooling.

6. The method of claim 1 wherein a larger amount of sintered magnesia crystals is formed during insulated ingot cooling than is formed during non-insulated ingot cooling.

7. The method of claim 1 wherein larger amounts of both recrystallized magnesia crystals and sintered magnesia crystals are formed during insulated ingot cooling than are formed during non-insulated ingot cooling.

8. The method of claim 1 wherein the heated ingot is insulated during ingot cooling by physical engagement with a refractory material.

9. The method of claim 1 wherein the heated ingot is insulated during ingot cooling by having its periphery wrapped with a blanket member of refractory material.

10. A method to prepare fused magnesia particulates which comprises:
    (a) fusing a batch charge of mineral grade magnesia crystals in an electric arc furnace while charging additional batches of said mineral grade magnesia crystals during the fusing step to form a heated solid ingot having a central molten core,
    (b) removing the still heated solid ingot from the electric arc furnace before the central molten core of said ingot has reached the recrystallization temperature of magnesia,
    (c) physically engaging the periphery of said heated ingot with a refractory insulation while permitting said ingot to cool to ambient temperatures forming a central core of recrystallized magnesia crystals surrounded by sintered magnesia crystals, and
    (d) pulverizing the cooled ingot by mechanical means to produce a physical mixture of the recrystallized and sintered magnesia particulates.

11. The method of claim 10 wherein chemical impurities in the batch charges are removed from the recrystallized magnesia particles during ingot cooling.

12. The method of claim 10 wherein a larger size ingot is formed during insulated ingot cooling.

13. The method of claim 10 wherein a larger amount of recrystallized magnesia crystals is formed during insulated ingot cooling than is formed during non-insulated ingot cooling.

14. The method of claim 10 wherein a larger amount of sintered magnesia crystals is formed during insulated ingot cooling than is formed during non-insulated ingot cooling.

15. The method of claim 10 wherein larger amounts of both recrystallized magnesia crystals and sintered magnesia crystals are formed during ingot cooling than are formed during non-insulated insulated ingot cooling.

16. The method of claim 10 wherein the physical mixture of recrystallized and sintered magnesia particulates are coated with a lubricant after pulverizing to form a free-flowing powder.

* * * * *